(12) United States Patent
Lo et al.

(10) Patent No.: US 6,260,167 B1
(45) Date of Patent: Jul. 10, 2001

(54) APPARATUS AND METHOD FOR DETERMINISTIC RECEIVER TESTING

(75) Inventors: William Lo, Cupertino; Yuhua Huang, San Jose, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/255,708

(22) Filed: Feb. 23, 1999

(51) Int. Cl.[7] ................................... G01R 31/28
(52) U.S. Cl. .................... 714/744; 714/738; 714/735
(58) Field of Search .................... 714/724, 732, 714/733, 734, 735, 736, 738, 744

(56) References Cited

U.S. PATENT DOCUMENTS

| | | | |
|---|---|---|---|
| 3,596,245 | * 7/1971 | Finnie et al. .................... 714/707 |
| 4,170,714 | * 10/1979 | Branscome et al. .................... 380/2 |
| 4,791,356 | * 12/1988 | Warren et al. .................... 324/73.1 |
| 4,791,357 | * 12/1988 | Hyduke .................... 324/73.1 |
| 5,001,714 | * 3/1991 | Stark et al. .................... 714/737 |
| 5,020,011 | * 5/1991 | Stark et al. .................... 702/185 |
| 5,197,062 | * 3/1993 | Picklesimer .................... 370/508 |
| 5,241,266 | * 8/1993 | Ahmad et al. .................... 714/733 |
| 5,309,428 | * 5/1994 | Copley et al. .................... 370/245 |
| 5,619,509 | * 4/1997 | Maruyama et al. .................... 714/707 |
| 5,862,177 | * 1/1999 | Cummings et al. .................... 375/224 |
| 5,896,417 | * 4/1999 | Lau .................... 375/258 |
| 6,101,864 | * 8/2000 | Abrams et al. .................... 73/1.01 |

\* cited by examiner

*Primary Examiner*—Albert Decady
*Assistant Examiner*—Joseph D. Torres

(57) ABSTRACT

A physical layer (PHY) device in an Ethernet type LAN is configured to permit ease of testing of the PHY device's logic. The PHY device comprises a PHY receiver, a start frame delimiter detector (SFD), and automatic checker circuitry in which the clock position and the PHY pop-up position of received signals can be determined. The automatic checker circuitry receives a data signal having a predetermined pattern corresponding to a valid data packet from a pattern generating circuit. The automatic checker circuitry outputs a verification signal indicating whether the supplied signals are valid. This arrangement supports a one pass test, which reduces production costs and testing duration.

16 Claims, 4 Drawing Sheets

APPARATUS AND METHOD FOR DETERMINISTIC RECEIVER TESTING

BACKGROUND OF THE INVENTION

1. Technical Field

The present invention relates to testing of data communication networking devices, more particularly to a transceiver employed in an Ethernet type network.

2. Background Art

Device testing plays a critical role in the manufacturing of networking equipment. Manufacturers are continually seeking ways to produce these equipment economically. One effective way is to reduce testing costs. Because of the prevalence of local area networks, even a small cost reduction measure translates into a competitive edge in the marketplace.

Local area networks use a network cable or other network media to link nodes (e.g., workstations, routers and switches) to the network. Each local area network architecture uses a media access control (MAC) enabling network interface device at each network node to share access to the media. Physical (PHY) layer devices are configured for translating digital packet data received from a MAC across a standardized interface, e.g., a Media Independent Interface (MII), into an analog signal for transmission on the network medium, and reception of analog signals transmitted from a remote node via the network medium. An example is the 100Base-TX Ethernet (IEEE Standard 802.3u) transceiver, which is configured for transmitting and receiving a Multi-level Transmission-3 (MLT-3) encoded analog signal over unshielded (or shielded) twisted pair copper wiring.

To transmit a MLT-3 encoded signal across the media, 4-bit codes from the MII are supplied to a 4B/5B (4 bit/5 bit) encoder. The newly generated 5-bit symbols are serialized and outputted onto the physical media as MLT-3 encoded signals at 125 Mbps. The physical channel rate of 125 Mbps results from use of a 25 MHz internal clock that is multiplied by 5. The physical channel rate of 125 Mbps, at the receive end, is effectively reduced to a 100 Mbps physical layer interface because the received 5-bit symbols are decoded back into 4-bit MII codes (i.e., nibbles). Although the physical channel rate is 125 MHz, the MII utilizes a 25 MHz clock. A digital phase-locked loop (PLL) recovers the clock information. A deserializer performs a serial to parallel conversion in which one serial bit translates to 5 outgoing parallel bits to maintain the 125 MHz rate.

On the receive side of the transceiver, there is a concern with phase alignment during testing. At power up or reset, the PLL requires a period of time to calibrate itself, and therefore, can not immediately align itself with the incoming signals. The number of 125 MHz clock cycles that are generated by the receive side is not deterministic until the PLL stabilizes. As a result, alignment is unknown until stabilization of the PLL. Factors that contribute to the non-deterministic nature of the clock cycles include the unknown initial state of the PLL, process variation, and temperature and voltage at the time of power-up. Under normal operation, the non-deterministic nature of the number of clock cycles is a "don't care" during power up. However, this poses a problem during testing of the PHY devices. In particular, the 125 MHz clock is divided by 5 to generate a 25 MHz clock. Since the number of 125 MHz receive clock cycles is not exactly known, the divided by 5 clock and parallel data can be phase shifted in any one of 5 possible positions (i.e., PHY pop-up positions), shown in FIG. 1. Hence, the PHY receiver must determine PHY pop-up position and extract clock information from the incoming MLT-3 signals so that data can be properly retrieved. PHY pop-up position refers to the bit sequence that is conveyed by the received signal during power up or reset of the PHY device.

FIG. 1 is a signal diagram illustrating the relationship between the received serialized data stream and the converted parallel data. The received bit stream 10 are designated as a serialized sequence of bits A, B, C, D, E, F, G, H, and I. These designations are merely to convey relative bit positions, which are unknown. As previously mentioned, five possible PHY pop-up positions 12, 14, 16, 18, and 20 exist from the serialized data stream 10. At power up, the PHY receiver may receive bits beginning with anyone of these positions. For example, the first PHY pop-up position 12 may start with bit A, in which case the retrieved bit sequence 22 is ABCDE. If the 25 MHz clock starts when bit B is received (14), the bit sequence yields BCDEF 24. With a PHY pop-up position of C (16), the sequence 26 is CDEFG. Sequence DEFGH (28) stems from the 25 MHz clock starting at bit D (18). If the PHY pop-up position is at E (20), the sequence is EFGHI (30).

In an operational network, the PHY device achieves alignment by seeking out the JK delimiter symbols using back-end logic. Back-end logic refers to processing capabilities of other components or higher level processes. In a test environment, however, certain context-specific information (e.g., alignment, clock, etc.) are not present. Specifically, alignment is problematic because back-end logic is not available in the test environment to extract the needed information. Rather, testers compare the output of the device against a known set of signal/bit patterns on a cycle by cycle basis. This poses a problem because the tester does not know to which of the five possible test patterns to use for proper comparison. Testing on a cycle by cycle basis, traditionally, has required performing multiple iterations of a test procedure (i.e., multiple passes) to calculate PHY pop-up position and clocking information. These two parameters are used to determine whether the PHY device is operating correctly. The conventional test procedure involves iterative steps to attempt to lock on the edges of the incoming signals. This approach also examines the actual individual signals off the MII to determine whether they are valid, thereby expending a large amount of time. In addition, such testing may require development of new circuitry to rapidly determine the clock signal and the PHY pop-up position. Both factors of increased testing time and development of new circuitry contribute to a significant increase in production costs.

SUMMARY OF THE INVENTION

There is a need for an arrangement for testing a PHY receiver device in a single test without the necessity for back-end logic. There is a need to test a PHY device without having to align the output signals of the PHY device. Further, there is a need to conduct PHY device testing by using existing error checking logic.

These and other needs are attained by the present invention, where a system for testing a networking device comprises a pattern generator for generating a known valid bit pattern for a data packet. A physical layer (PHY) device is configured for outputting a data signal and a receive clock signal in response to the known valid bit pattern and based on a prescribed operation of the PHY device. The PHY device comprises an error checking circuit configured for detecting an error in a received data frame. The error checking circuit selectively outputs a pass signal indicating operation of the PHY device in accordance with the prescribed operation based on the data signal. Because only the pass signal needs to be examined for testing purposes, there is a significant reduction of testing time during the production of the networking devices.

According to one aspect of the present invention, a system for testing a networking device comprises a pattern generating circuit for generating a known bit pattern for a data packet in accordance to a prescribed network protocol. A PHY device is configured for outputting a data signal and a receive clock signal in response to the known valid bit pattern and based on a prescribed operation of the PHY device. An error checking circuit is configured for detecting an error in a received data frame, the error checking circuit selectively outputting a pass signal indicating operation of the PHY device in accordance with the prescribed operation based on the data signal. Hence, under this approach, the production costs can be significantly curbed with a reduction of testing time.

Still another aspect of the present invention provides a method for testing logic of a PHY device. The method comprises generating a known bit pattern according to a prescribed network protocol. A receive data signal and a receive clock signal is produced in response to the known bit pattern and based on a prescribed operation of the PHY device. The method further includes performing error checking of a received data frame in an error checking circuit. The error checking circuit is configured for detecting an error in a received data frame, and selectively outputting a pass signal indicating operation of the PHY device in accordance with the prescribed operation. With this method, testing is simplified by having to examine only the pass signal to determine proper operation of the PHY device.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Although the present invention has direct applicability to testing of a 10/100Base-TX networking device, it will become apparent that the present invention is also applicable to other PHY layer devices and other Ethernet type network protocols.

The ability to quickly test a device, in this case a PHY device 201 (FIG. 2), is highly valued in the rapidly growing industry of data communications. Conventional testing methods require the examination of the actual signals themselves across the MII. In doing so, valuable time is expended because of the need to perform multiple passes to ensure an accurate determination of whether the logic of the PHY device is correct. The present invention, however, provides an arrangement whereby only a single output signal needs to be examined without having to extract alignment and clock information in order to properly test the PHY device's logic. Essentially, the testing signals, which may be produced by a pattern generator, are supplied to the PHY device. The PHY device, in one embodiment, comprises an error checking circuit. The error checking circuit performs a validity check of the testing signals and outputs a pass signal. The pass signal indicates whether the PHY device's logic is correct; accordingly, no other signals require examination. This simplified process greatly reduces the amount of testing time.

Figure 2:
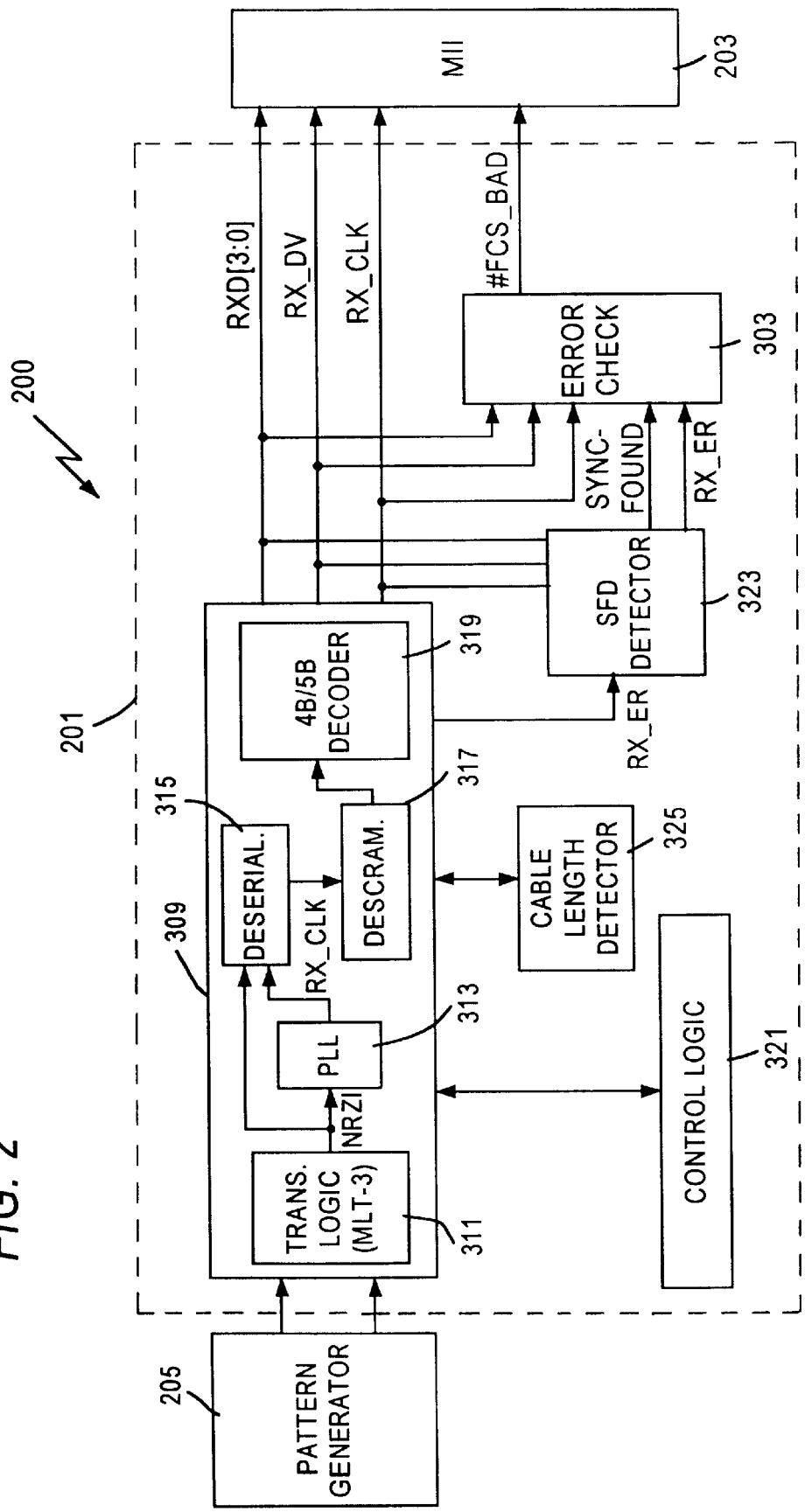
FIG. 2 is a diagram of an arrangement for testing a physical layer (P) receiver in accord with an embodiment of the present invention.

FIG. 2 illustrates the testing system 200 in accord with an embodiment of the present invention. A PHY device 201 interacts with a media independent interface (MII) 203 to communicate with a media access control (MAC) (not shown) according to the IEEE 802.3 protocol. The PHY device 201 enables ease of testing by examining only the output of an error checking circuit 303, which in this case, is a cyclic redundancy check (CRC) logic. As shown in FIG. 2, the test system 200 includes a pattern generator 205 that generates differential receive network signals (Rx+ and Rx−) carrying a prescribed data pattern representing a data packet transmitted according to the IEEE 802.3 standard. Receive network signals, Rx+ and Rx−, are supplied via a physical medium (not shown) to a PHY receiver 309 for processing. Recever 309 is connected to control logic 321.

The PHY device 201 includes a cable length detector 325, which determines the cable length associated with the physical medium in order to properly compensate for attenuation of the received signals caused by cable lengths. The cable length detection is performed on a periodic basis. By examining the reduction in signal strength in receive signals, the cable length detector 325 calculates the changes in cable length that are attributable to, for example, temperature. In this manner, the received signals can be processed to compensate for the calculated attenuation. Because the received signals conform to the Multilevel Transmission-3 protocol (in the case of 100Base-TX LANs), a translation logic 311 is needed to convert the received MLT-3 signals to NRZI (Non-Return to Zero Interface) signals.

Figure 1:
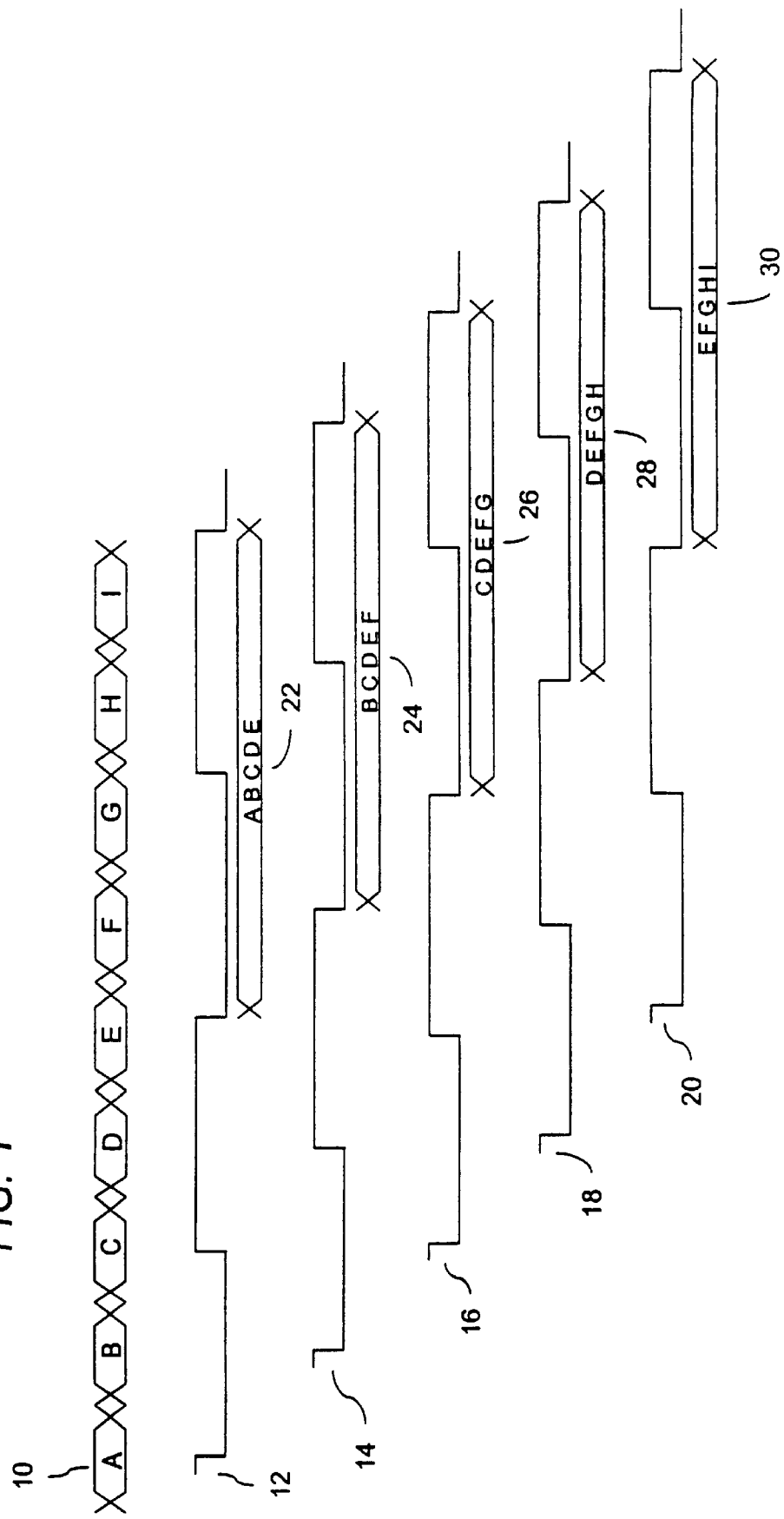
FIG. 1 is a signal diagram illustrating the relationship between a serialized data stream and the possible parallel symbols during a device power up or reset.

Once translated, the NRZI signals is supplied to a phase-locked loop (PLL) 313, shown in FIG. 2. The PLL 313 recovers the clock frequency from the NRZI signals. In the preferred embodiment, the PLL 313 is a digital PLL, in which digital logic is utilized for phase detection and filtering. The PLL 313, accordingly, outputs a clock signal, RX_CLK. Next, a deserializer 315 performs the conversion from the serialized bit stream of the NRZI signals to a parallel 5-bit symbol. For example, the bit stream 10 of FIG. 1 is converted to one of the possible 5-bit symbols 22, 24, 26, 28, and 30. A descrambler 317 pro devices (e.g., 201) employ scrambling and descrambling as a way to reduce electromagnetic interference (EMI) peaks in the radiated signal caused by repetitive patterns of symbolic 0's and 1's. Scrambling is accomplished on the transmit side, in which a random number generator outputs a bit that is added to the MII bit sequence. The MII bit sequence is a 4-bit code (i.e., nibble). The descrambler 317 reverses the process on the receive side.

The descrambled signal is then supplied to a 4B/5B (4bit/5bit) decoder 319. The 4B/5B decoder 319 decodes the 5-bit symbols into 4-bit nibbles of receive data RXD[3:0] by stripping the random bit out of the 5-bit symbol. This conversion from 5-bits to 4-bits effectively reduces the 125 Mbps physical channel rate to a data rate of 100 Mbps. Once the 5-bit entities are decoded and converted into 4-bit nibbles, the 4-bit nibbles are passed onto the MII interface 203 (of FIG. 2) as a 4-bit receive data signal (RXD[0:3]).

In addition to the RXD[3:0] signal and the RX_CLK from the PLL 313, the PHY receiver 309 also outputs a receive data valid signal (RX_DV). The 4B/5B decoder 319 outputs a receive error output signal (RX_ER) to a start frame delimiter (SFD) detector 323. RX_ER indicates whether an error was detected in the frame presently being transferred. The SFD detector 323 compares the RXD[3:0] signals with a predetermined bit pattern to determine the beginning of a receive data packet. As an example, the predetermined bit pattern may be "10101011." If a match is found and the RX_DV signal is valid, the SFD detector 323 outputs a SYNCFOUND signal as a logical high to indicate that the RXD[3:0] signal corresponds to the beginning of a received data packet carrying valid data. Details of the SFD detector 323 are discussed later with respect to FIG. 3.

The SFD detector 323 supplies the SYNCFOUND signal to the error checking circuit 303. The error checking circuit 303 further receives the RXD[3:0], RXDV, and RX_CLK signals, which are supplied to the MII 203 by the PHY receiver 309. In response to these signals, the error checking circuit 303 selectively outputs an #FCS_BAD (frame check sequence bad) signal (or pass signal) to a management portion of the MII 203, for example via a management data input output (MDIO) signal path. The error checking circuit 303 performs the CRC check once the generated valid data packet from the pattern generator 205 has been completely received and processed by the PHY receiver 309. This outputted pass signal indicates whether the received signals and associated PHY receiver logic pass a prescribed validation check, for example a CRC check as specified by IEEE 802.3. If the CRC check is successful, the #FCS_BAD is asserted. A successful CRC check means, among other things, that the PHY device 201 has performed its operations correctly because the received data packet from the pattern generator 205 is known to be valid. Thus, in terms of PHY device testing, only the #FCS_BAD, which is supplied to the MII 203, needs to be examined during operational testing of the PHY device 201. As a result, neither the PHY pop-up position nor the clock frequency needs to be determined to test the operations of the PHY device 201. In contrast, the conventional method of testing necessitates a bit by bit examination of the signals off the MII; thereby, requiring multiple test iterations to extract clock information, which is then used to align the bits for determining validation of the PHY device's operation.

Figure 3:
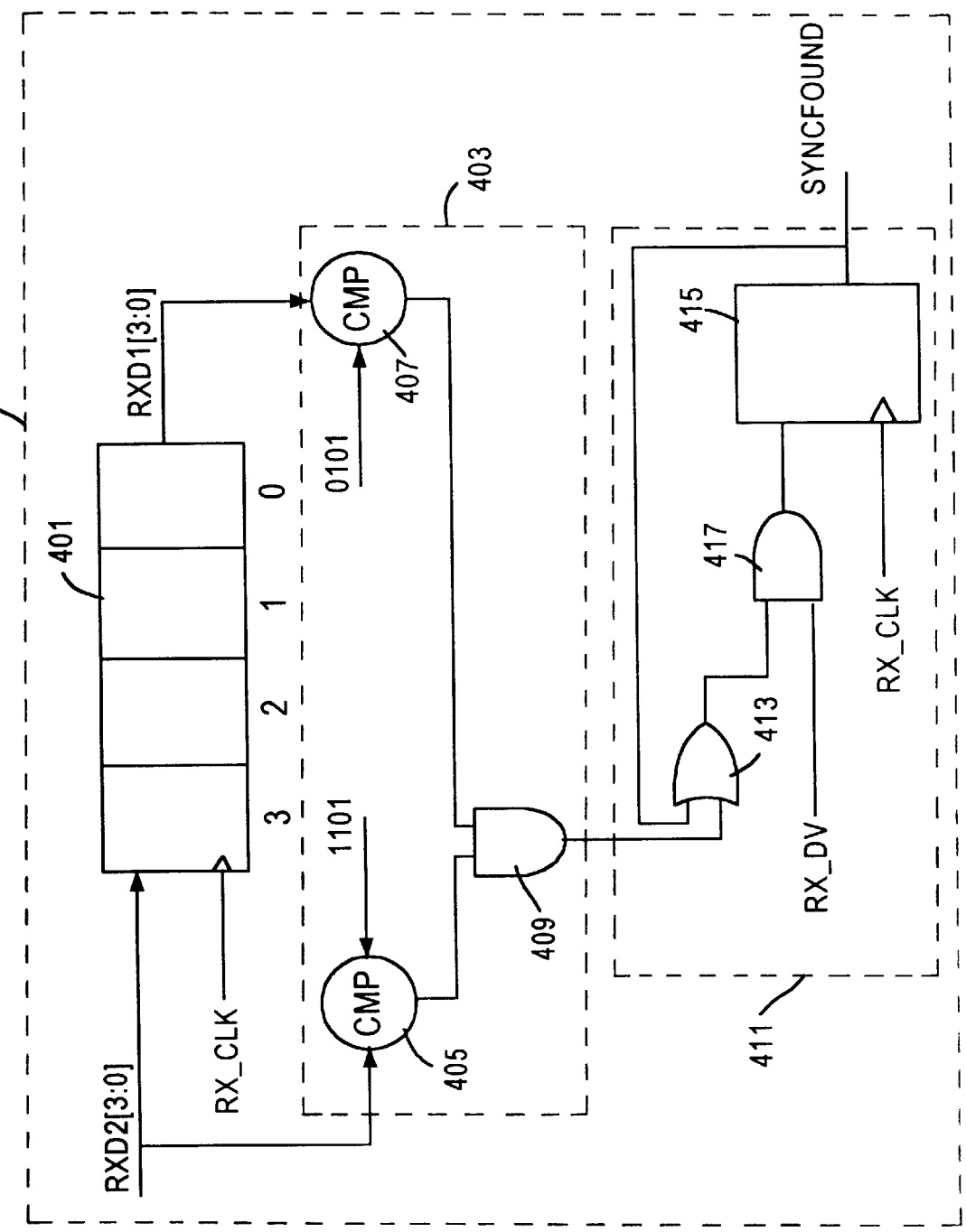
FIG. 3 is a diagram illustrating a start frame delimiter circuit according to an embodiment of the present invention.

FIG. 3 shows an exemplary embodiment of the SFD detector 323 within the PHY 201 device. The detector 323 receives two successive nibbles of data signals (i.e., RXD1 [3:0] and RXD2[3:0]) in order to compare a collective byte to a predetermined bit pattern (or alignment bit pattern); e.g., 10101011. The predetermined bit pattern denotes the start of the data frame. A first instance of the RXD[3:0] signal, labeled RXD1[3:0], is shifted into a 4-bit shift register 401 according to the clock signal, RX_CLK. At the next 25 MHz clock cycle, a second RXD[3:0] signal (denoted RXD2 [3:0]) is supplied to the SFD detector 323. Both RXDI[3:0] and RXD2[3:0] are supplied to a comparison circuit 403, which includes comparators 405 and 407 as well as an AND gate 409. Comparator 405 receives inputs RXD2[3:0] and a bit sequence 1101. Note that this bit sequence corresponds to the least four significant bits of the predetermined bit pattern; however, the bit sequence is arranged in reverse order to coincide with the order the predetermined bit pattern is cycled into the circuit. The output of comparator 405 is supplied to the AND gate 409. The comparator 407 compares RXD1[0:3] and bit sequence 0101, outputting to the second input lead of XOR gate 409. Similarly, the 0101 bit sequence corresponds to the four most significant bits of the predetermined bit pattern arranged in reverse order.

AND gate 409 is a logical HIGH if there is a match between the start frame delimiter bit pattern and the two nibbles, RXDI[3:0] and RXD2[3:0]. The result of AND gate 409 is supplied to the synchronization logic 411. In particular, this result is inputted to an OR gate 413. The OR gate 413 has its other input supplied from the output of flip-flop 415 in a feedback arrangement. The output of OR gate 413 feeds an AND gate 417, which outputs to flip-flop 415 based upon the RX_DV signal (as the other input) from the PHY receiver 309. The flip-flop 415 outputs a SYNC-FOUND signal to the error checking circuit 303 (FIG. 2). The SYNCFOUND signal is asserted when the received signals are valid and the predetermined bit pattern matches.

Figure 4:
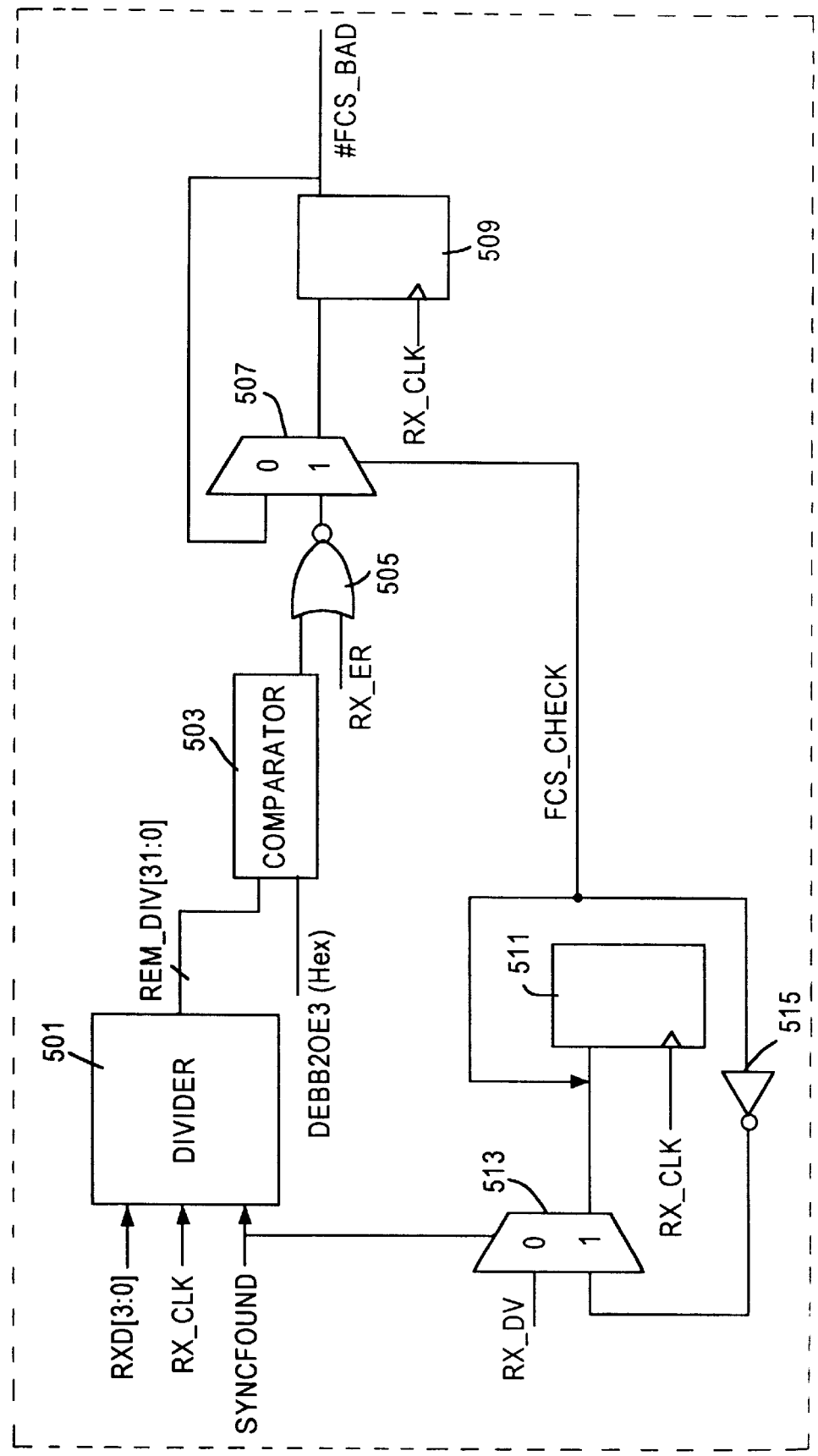
FIG. 4 is a diagram illustrating error checking circuit according to an embodiment of the present invention.

FIG. 4 illustrates one example of the error checking circuit 303 used in the PHY device 201. As mentioned before, the present invention relies on the functionality of the error checking circuit 303 to determine whether the PHY device 201 performs correctly without the need to derive the clock information and the PHY pop-up position using back-end logic. In this embodiment, the error checking circuit 303 is a standard IEEE 802.3 CRC-32 logic, which generates a 32-bit frame check sequence (FCS). Alternatively, other error-detection codes may be implemented; e.g., BCH (Bose, Chaudhuri, and Hocquenghem) codes, Hamming codes, etc.

The error checking circuit 303 includes a divider 501 that generates a 32-bit remainder, REM_DIV[31:0] in response to the RXD[3:0], RX_CLK, and SYNCFOUND signals. The remainder is generated by cycling the data signals, which constitute a full packet, in the divider 501. According to the IEEE 802.3 CRC algorithm, the expected remainder is DEBB20E3 (in hexadecimal). This hexadecimal value serves as the error code key to determine whether the data is valid. Thus, REM_DIV[3 1:0] is compared with DEBB20E3 in comparator 503. The result of the comparator 503 is inputted to OR gate 505; the other input to OR gate 505 is the RX_ER signal from the 4B/5B decoder 319. A multiplexer (MUX) 507 receives the output of the NOR gate 505 at the "1" input. The "0" input of MUX 507 originates from the output of flip-flop 509. MUX 507 outputs to flip-flop 509 in response to a FCS_CHECK signal. The FCS_CHECK signal is outputted from flip-flop 511. MUX 513 outputs to flip-flop 511; the "1" input of MUX 513 is the FCS_CHECK signal fed back through an inverter 515. The error checking circuit 303, ultimately, generates a #FCS_BAD signal and supplies it to the MII 203. The #FCS_BAD signal is high if the receive signals are valid and if the PHY device 201 operates correctly. On the other hand, if the #FCS_BAD signal is low, then the PHY device 201 has failed, indicating that the PHY device is defective.

According to the disclosed embodiment, the error checking circuit within the PHY device permits the examination of a single signal to determine whether the PHY device is properly operating. By reading the one bit (#FCS_BAD) out of the MII, only a single pass is required to determine whether testing of the PHY device's logic is successful.

Under this approach, the testing time is greatly reduced during the manufacturing and production of the PHY devices, resulting in significant cost savings.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A system for testing a networking device comprising:
    a pattern generator for generating a known valid bit pattern for a data packet; and
    a physical layer (PHY) device configured for outputting a data signal and a receive clock signal in response to the known valid bit pattern and based on a prescribed operation of the PHY device, the PHY device comprising an error checking circuit configured for detecting an error in a received data frame, wherein
    the error checking circuit selectively outputs a pass signal indicating operation of the PHY device in accordance with the prescribed operation based on the data signal, and
    the PHY device comprises:
        a translation logic for converting a tri-level signal to a serial bi-level signal,
        a phase-locked loop (PLL) for generating the receive clock signal based upon the bi-level signal,
        a deserializer for converting the serial bi-level signal to a first bit sequence of a first length,
        a descrambler for processing the first bit sequence of a first length to descramble the bits, and
        a bit decoder for decoding the descrambled first bit sequence of a first length to a second bit sequence of a second length, the second bit sequence containing information associated with the known bit pattern and being outputted as the data signal.

2. The system as in claim 1, wherein the PHY device further comprises a start frame detector circuit for comparing the data signal with an alignment bit pattern to determine alignment of the received data frame.

3. The system as in claim 2, wherein the start frame detector circuit comprises:
    a shift register for storing a first instance of the second bit sequence;
    a comparison circuit including
        a first comparator for comparing the first instance of the second bit sequence with a first portion of the alignment bit pattern,
        a second comparator for comparing a second instance of the second bit sequence with a second portion of the alignment bit pattern, and
        a logic circuit receiving outputs from the first and second comparators and outputting a resultant bit sequence; and
    synchronization logic for outputting the synchronization signal based upon the resultant bit sequence and a receive data valid bit, the receive data valid bit indicating origin of the second bit sequence.

4. The system as in claim 1, wherein the tri-level signal is a Multi-level Transmission-3 (MLT-3) signal and the bi-level signal is a Non-Return to Zero Inverted (NRZI) signal, respectively, and the first length is 5-bits long, the second length being 4-bits long.

5. The system as in claim 1, wherein the error checking circuit comprises cyclic redundancy check (CRC) logic.

6. The system as in claim 1, wherein the known bit pattern conforms to an IEEE 802.3 protocol.

7. A system for testing a networking device comprising:
    a pattern generating circuit for generating a known bit pattern for a data packet in accordance to a prescribed network protocol;
    a physical layer (PHY) device configured for outputting a data signal and a receive clock signal in response to the known valid bit pattern and based on a prescribed operation of the PHY device; and
    an error checking circuit configured for detecting an error in a received data frame, the error checking circuit selectively outputting a pass signal indicating operation of the PHY device in accordance with the prescribed operation based on the data signal, wherein the PHY device comprises:
        a translation logic for converting a tri-level signal to a serial bi-level signal,
        a phase-locked loop (PLL) for producing the receive clock signal from the bi-level signal,
        a deserializer for converting the serial bi-level signal to a first bit sequence of a first length,
        a descrambler for processing the first bit sequence of a first length to descramble the bits, and
        a bit decoder for decoding the descrambled first bit sequence of a first length to a second bit sequence of a second length, the second bit sequence containing information associated with the known bit pattern and being outputted as the data signal.

8. The system as in claim 7, wherein the PHY device further comprises a start frame detector circuit for comparing the data signal with an alignment bit pattern to determine alignment of the received data frame.

9. The system as in claim 8, wherein the start frame detector circuit comprises:
    a shift register for storing a first instance of the second bit sequence;
    a comparison circuit including
        a first comparator for comparing the first instance of the second bit sequence with a first portion of a predetermined bit pattern,
        the second comparator for comparing a second instance of the second bit sequence with a second portion of the predetermined bit pattern, and
        a logic circuit receiving outputs from the first and second comparators and outputting a resultant bit sequence; and
    synchronization logic for outputting the synchronization signal based upon the resultant bit sequence and a receive data valid bit, the receive data valid bit indicating origin of the second bit sequence.

10. The system as in claim 7, wherein the tri-level signal is a Multi-level Transmission-3 (MLT-3) signal and the bi-level signal is a Non-Return to Zero Inverted (NRZI) signal, respectively, and the first length is 5-bits long, the second length being 4-bits long.

11. The system as in claim 7, wherein the error checking circuit comprises cyclic redundancy check (CRC) logic.

12. The system as in claim 7, wherein the prescribed network protocol is an IEEE 802.3 protocol.

13. A method for testing logic of a physical layer (PHY) device, the method comprising:
    generating a known bit pattern according to a prescribed network protocol;
    producing a receive data signal and a receive clock signal in response to the known bit pattern and based on a prescribed operation of the PHY device; and performing error checking of a received data frame in an error checking circuit configured for detecting an error in a received data frame, and selectively outputting from the error checking circuit a pass signal indicating operation of the PHY device in accordance with the prescribed operation, wherein the step of producing a received data signal and a receive clock signal includes:

converting a tri-level signal into a bi-level signal, generating the clock signal based upon the bi-level signal, decoding a first bit sequence of a first length associated with the bi-level signal to a second bit sequence of a second length, the second bit sequence containing information associated with the known bit pattern and being outputted as the data signal, and performing validation of the data signal and the clock signal; and the step of performing validation of the data signal and the clock signal includes comparing with a first comparator a first instance of the second bit sequence signal with a first portion of a predetermined bit pattern, comparing with a second comparator a second instance of the second bit sequence with a second portion of the predetermined bit patten, inputting outputs from the first and second comparators to a logic circuit, outputting from the logic circuit a resultant bit sequence, inputting the resultant bit sequence to a synchronization logic, and outputting a synchronization signal based upon the resultant bit sequence and a receive data valid bit.

14. The system as in claim 13, wherein the tri-level signal is a Multi-level Transmission-3 (MLT-3) signal and the bi-level signal is a Non-Return to Zero Interface (NRZI) signal, respectively, and the first length is 5-bits long, the second length being 4-bits long.

15. The method as in claim 13, wherein the step of performing is executed by cyclic redundancy check (CRC) logic.

16. The method as in claim 13, wherein the prescribed network protocol is an IEEE 802.3 protocol.

* * * * *